United States Patent
Poindexter et al.

(10) Patent No.: US 7,603,649 B2
(45) Date of Patent: Oct. 13, 2009

(54) SYSTEM FOR ENTERPRISE-WIDE WORK FLOW AUTOMATION

(75) Inventors: Luen Kimball Poindexter, Laguna Beach, CA (US); Glenn R. Seidman, Woodside, CA (US); Stephen R. Timm, Long Beach, CA (US); Bruce A. Waddington, Dana Point, CA (US)

(73) Assignee: International Business Machines Corporation, Armonk, NY (US)

( * ) Notice: Subject to any disclaimer, the term of this patent is extended or adjusted under 35 U.S.C. 154(b) by 641 days.

(21) Appl. No.: 10/328,072

(22) Filed: Dec. 23, 2002

(65) Prior Publication Data

US 2003/0093458 A1    May 15, 2003

Related U.S. Application Data

(63) Continuation of application No. 09/989,833, filed on Nov. 19, 2001, now Pat. No. 7,010,602, which is a continuation of application No. 08/899,408, filed on Jul. 23, 1997, now Pat. No. 6,338,074.

(51) Int. Cl.
*G06F 9/44* (2006.01)
(52) U.S. Cl. ................................. 717/102; 717/104
(58) Field of Classification Search .......... 717/101–105
See application file for complete search history.

(56) References Cited

U.S. PATENT DOCUMENTS

| | | |
|---|---|---|
| 4,503,499 A | 3/1985 | Mason et al. |
| 4,532,588 A | 7/1985 | Foster |
| 4,648,061 A | 3/1987 | Foster |
| 4,713,780 A | 12/1987 | Schultz et al. |
| 4,754,428 A | 6/1988 | Schultz et al. |
| 4,932,026 A | 6/1990 | Dev et al. |
| 5,113,393 A | 5/1992 | Kam et al. |
| 5,125,075 A | 6/1992 | Goodale et al. |
| 5,155,858 A | 10/1992 | DeBruler et al. |
| 5,216,603 A | 6/1993 | Flores et al. |
| 5,321,841 A | 6/1994 | East et al. |

(Continued)

FOREIGN PATENT DOCUMENTS

| | | |
|---|---|---|
| EP | 0 457 684 A2 | 11/1991 |
| EP | 0 793 184 A2 | 9/1997 |

OTHER PUBLICATIONS

Hollingsworth, "Workflow Management Coalition The Workflow Reference Model", Workflow Management Coalition WfMC, Hampshire, UK, pp. 1-55, 1995.*

(Continued)

*Primary Examiner*—Ted T. Vo
(74) *Attorney, Agent, or Firm*—Janaki K. Davda; Konrad Raynes & Victor LLP

(57) ABSTRACT

Methods and apparatus are provided for a enterprise-wide work flow system that may encompass multiple geographically separate sites. The sites may be either permanently or transiently linked. A single computer network may accommodate multiple work flow systems and a single work flow system may be distributed over multiple local area networks. The system maintains the paradigm of one global queue per service and provides for individual work flow systems to export services to one another in an enterprise.

20 Claims, 5 Drawing Sheets

U.S. PATENT DOCUMENTS

| | | |
|---|---|---|
| 5,634,127 A | 5/1997 | Cloud et al. |
| 5,680,548 A | 10/1997 | Trugman |
| 5,710,921 A | 1/1998 | Hirose |
| 5,745,901 A | 4/1998 | Entner et al. |
| 5,819,092 A | 10/1998 | Ferguson et al. |
| 5,864,679 A | 1/1999 | Kanai et al. |
| 5,870,545 A | 2/1999 | Davis et al. |
| 5,881,238 A | 3/1999 | Aman et al. |
| 5,920,725 A | 7/1999 | Ma et al. |
| 5,931,917 A | 8/1999 | Nguyen et al. |
| 5,940,612 A | 8/1999 | Brady et al. |
| 5,940,804 A | 8/1999 | Turley et al. |
| 5,960,404 A | 9/1999 | Chaar et al. |
| 5,974,392 A | 10/1999 | Endo |
| 5,991,733 A | 11/1999 | Aleia et al. |
| 6,006,193 A | 12/1999 | Gibson et al. |
| 6,014,673 A | 1/2000 | Davis et al. |
| 6,041,306 A | 3/2000 | Du et al. |
| 6,043,819 A | 3/2000 | LeBrun et al. |
| 6,073,109 A | 6/2000 | Flores et al. |
| 2002/0023175 A1 | 2/2002 | Karlak et al. |

OTHER PUBLICATIONS

User Manual, *Getting Started with Visual WorkFlo*, Release 1.0, Part No. 6576-105, FileNet Corporation, Costa Mesa, California (Dec. 1994).

D. Tsichritzis, *Office Automation*, Springer-Verlag Berlin Heidelberg (Tsichritzis ed.), pp. 379-398, 1985.

Compton, M.M. et al., "Intelligent Validation and Routing of Electronic Forms in a Distributed Workflow Environment," *Proceedings of the Tenth Conference on Artifical Intelligence for Applications*, 125-131 (1994).

Herschmann, D., "The Effects of Practical Business Constraints on User Interface Design," *Human Factors in Computing Systems, CHI '95 Conference Proceedings*, 531-537 (1995).

Schildt, Herbert, *Using Turbo C++* (1990).

Tsichritzis, D., *Office Automation*, Springer-Verlag Berlin Heidelberg (Tsichritzis ed.), pp. 379-398, 1985.

User Manual, *Getting Started with Visual Workflo*, Release 1.0, Part No. 6576-105, FileNet Corporation, Costa Mesa, California (Dec. 1994).

"Workflow Management Coalition Workflow Standard—Interoperability Internet E-Mail Mime Binding"; *The Workflow Management Coalition*; Oct. 20, 1996 (version 1.0); pp. 1-113.

"Workflow Management Coalition Workflow Standard—Interoperability Abstract Specification"; *The Workflow Management Coalition*; Oct. 20, 1996 (version 1.0); pp. 1-68.

\* cited by examiner

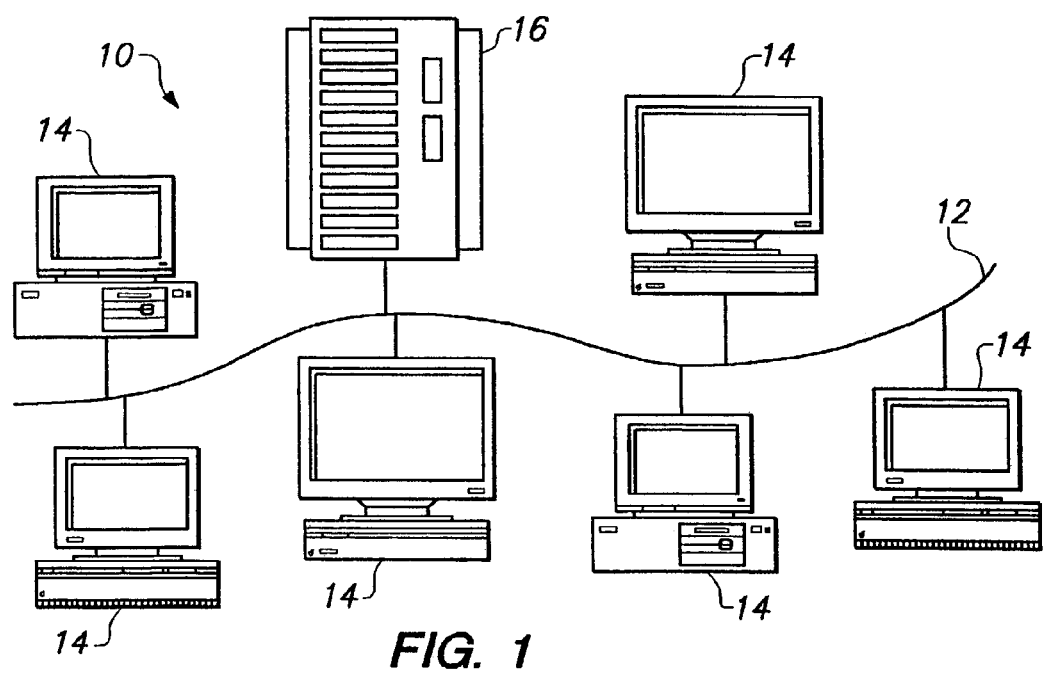
FIG. 1
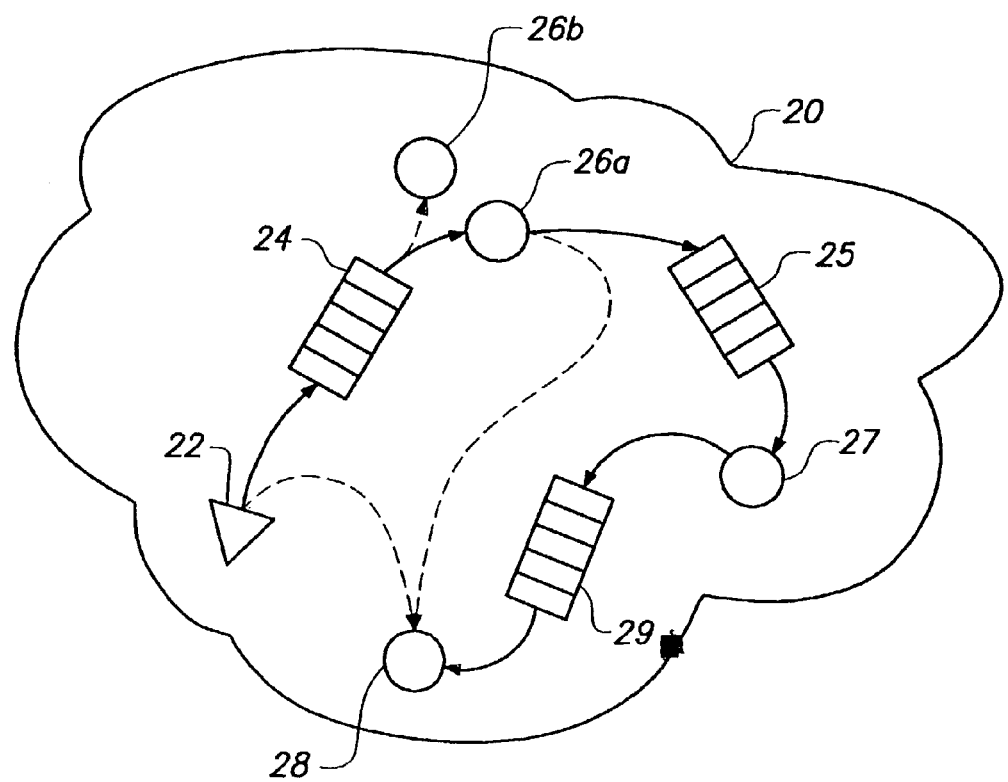
FIG. 2 *(PRIOR ART)*

| | | | | | | |
|---|---|---|---|---|---|---|
| System Configuration | | | WorkPerformerObject | | | |
| NWHighVolume | | | LoanPersonnel | | | |
| EasternCooperation | | | LoanAppraiser | | | |
| | | | LoanOfficer | | | |
| | | | LoanManager | | | |

| Partition | Weight | Authoring Repository | Configuration | Message Store | Persistent Store |
|---|---|---|---|---|---|
| loan > 203500 | -- | Paris | Loans | -- | -- |
| loan <= 203500 | 2 | -- | -- | QHandler1 | Chicago |
| loan <= 203500 | 1 | -- | -- | QHandler1 | Chicago |
| | | | | | |
| | | | | | |

SYSTEM FOR ENTERPRISE-WIDE WORK FLOW AUTOMATION

CROSS-REFERENCE TO RELATED APPLICATIONS

This is a continuation application of U.S. patent application Ser. No. 09/989,833, filed Nov. 19, 2001, which issued as U.S. Pat. No. 7,010,602, which is a continuation application of U.S. patent application Ser. No. 08/899,408, filed Jul. 23, 1997, which issued as U.S. Pat. No. 6,338,074, which are incorporated by reference herein in their entirety.

STATEMENT REGARDING FEDERALLY SPONSORED R&D

Not Applicable

PARTIES OF JOINT RESEARCH AGREEMENT

Not Applicable

REFERENCE TO SEQUENCE LISTING, TABLE, OR COMPUTER PROGRAM LISTING

Not Applicable

BACKGROUND OF THE INVENTION

1. Field of the Invention

The present invention relates generally to systems for automating document processing in a distributed computing environment. Specifically, the present invention relates to methods and apparatus for implementing work flow systems on an enterprise-wide scale.

2. Description of the Related Art

Paperwork is a fact of business life. To schedule a vacation or purchase office supplies a form must be filled out and processed in accordance with appropriate procedures, including receiving authorizations by various personnel. Similarly, information and data must be disseminated throughout a business organization in the form of sales reports, accounting projections, market surveys, and the like. In some organizations, elaborate written guidelines have been developed to specify what paperwork gets sent to whom and under what conditions.

Often paperwork must be transmitted to or processed by multiple organizational units of a company. For example, hiring a new research scientist may require approval of the research and development department, the accounting department, and the personnel department. In organizations, such as modern multi-national corporations, these organizational units may be located in different buildings, in different cities, or even in different countries.

The "paperless office" was conceived as a way to combat the ever increasing volume of paperwork by replacing paper forms with electronic documents stored in a computer. "Work flow" systems, such as the Workflo® Business System and Visual Workflo® sold by FileNet Corporation, Costa Mesa, Calif., provide the means to create the paperless office by substituting computer based objects for their paper-based counterparts. Such work flow systems provide distributed processing and distribution of data and information in accordance with procedures specified by the business analyst.

FileNet's Workflo® Business System provides a queue-based system for use in a client/server architecture in which objects are sequentially processed to accomplish a business procedure by scripts stored at the client stations. FileNet's Visual Workflo® enables the business procedure to be accomplished using work objects that are processed at client workstations in accordance with centrally stored Instruction Sheets that specify the steps to be performed to accomplish the business procedure.

Previously known work flow systems have been successful in automating document management for organizations located at a single geographic site or area. However, these work flow systems are not presently scalable from a system that serves a single site to a system that serves an organization spanning multiple geographically separate sites. In view of the foregoing, it would be desirable to provide a work flow system that may be scaled up from a single site system to a multi-site system.

Previously known work flow systems also may become excessively burdensome to administer and maintain when the number of users becomes relatively large. It would therefore be desirable to provide methods and apparatus for dividing a relatively large work flow system into multiple smaller cooperating partitions. Moreover, to provide seamless operation of the work flow system, it would be desirable to provide methods and apparatus for allowing intercommunication of multiple work flows wherein the communications technology is transparent to the work flow system.

In addition, the construction of previously known work flow systems may require detailed a priori analysis, so that the resulting work flow system does not experience bottlenecks that reduce overall throughput of the system. Accordingly, it would be desirable to provide methods and apparatus for dynamically balancing the flow of work through the system.

While previously known work flow systems generally involve only a single site, it would be desirable to provide methods and apparatus for connecting multiple work flows over a variety of communications links. Thus, it would be desirable to provide methods and apparatus for efficient and transparent inter-site communications while supporting many different connection mechanisms, in which the physical location of a work flow service is transparent to both the user and the work flow definition itself.

SUMMARY OF THE INVENTION

In view of the foregoing, it is an object of the present invention to provide a work flow system that is easily scaled up from serving a single site to serving multiple sites.

It is also an object of this invention to provide a system in which the physical location of a work flow service is transparent to both the user and the work flow definition itself.

It is an additional object of the present invention to provide efficient and transparent intersite communications while supporting many different connection mechanisms.

It is a further object of the invention to provide a system in which work flows may be grouped and partitioned.

These and other objects of the present invention are provided by a work flow system that may be partitioned into multiple self-contained work flows. Each work flow may advertise certain services for export to other work flows. In addition, a gateway mechanism is provided that enables a work flow to seamlessly span multiple computer networks. Optionally, a partitioned queue may be provided for efficiently distributing data objects to work flows located on remote networks.

BRIEF DESCRIPTION OF THE DRAWINGS

The above and other objects and advantages of the invention will be apparent upon consideration of the following detailed description, taken in conjunction with the following accompanying drawings, in which like reference characters refer to like parts throughout, and in which:

FIG. 1 depicts an exemplary local area network (LAN) suitable for use as a component of a work flow system constructed in accordance with the present invention;

FIG. 2 is a schematic illustration of a previously known single site, single partition work flow;

DETAILED DESCRIPTION OF THE INVENTION

Figure 3:
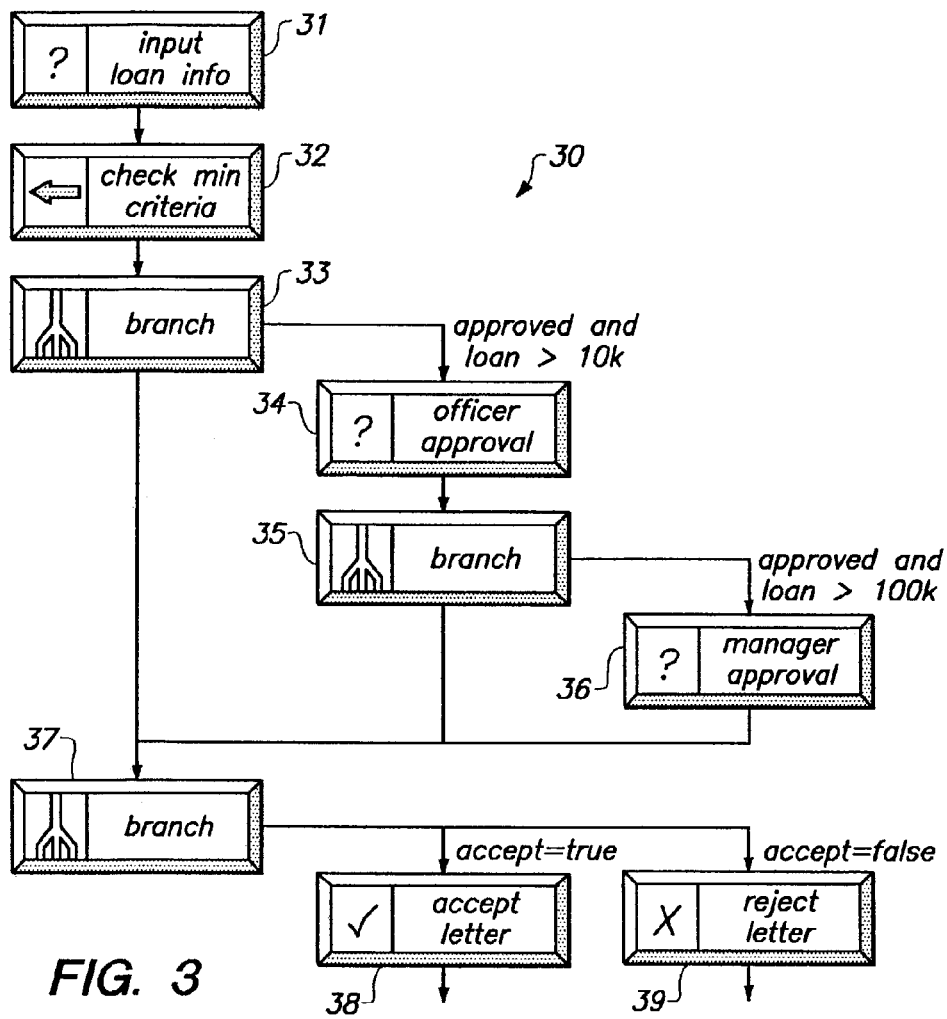
FIG. 3 is an illustrative portion of an Instruction Sheet suitable for use in a work flow system constructed in accordance with the present invention.

A work flow system typically comprises a LAN, such as LAN 10 schematically represented in FIG. 1, and software that controls the flow of information through the LAN. LAN 10 comprises workstations 14 and server 16. Cable 12, which may be coaxial cable, is routed throughout a site, such as an office, building, or campus, and is coupled to workstations 14 and server 16. LAN 10 provides a means for workstations 14 and server 16 to communicate with each other according to various LAN protocols and technologies, such as, for example, an Ethernet LAN. It is to be understood, however, that the principles disclosed herein are not limited to a particular LAN technology or protocol and may be practiced on other than Ethernet based networks.

As used herein, the term "work flow system" denotes a combination of hardware and software that makes up a system to automate a business procedure, and includes work objects that are processed by the system and Instruction Sheets that specify the sequence of steps in the process. The term "work flow" as used herein refers to the run-time software components and data that control the flow of information through the underlying distributed processing system.

In accordance with the principles of the present invention, a work flow system preferably employs an object-oriented model of the information and communication flow within an organization. Although many techniques and tools may be used to implement a work flow system, it is preferable to implement a work flow system using object-oriented techniques and tools, such as for example, the above-mentioned Visual Workflo® product sold by the assignee of the present invention. This preference for use of object-oriented programming techniques in a preferred embodiment of the present invention is reflected throughout this disclosure by the use of object-oriented terminology, as defined hereinbelow.

Although any general purpose programming language may be used, the software portion of a work flow system is preferably written in an object-oriented programming language. The C++ programming language may be advantageously used to construct a work flow system in accordance with the principles of the present invention. In programming a work flow system, each class of object is represented by a C++ class. The C++ class definitions encapsulate data attributes belonging to the class objects and methods or functions for working on those objects. Alternatively, the Java language developed by Sun Microsystems, Inc., Mountain View, Calif., is another object-oriented, platform independent programming language that may be advantageously employed in practicing the various features of the present invention.

As used herein, a class is an abstract representation of an entity in a work flow system, including data contained within the entity and methods of accessing or manipulating that data. An object is a specific instantiation of the entity described by a class definition. Accordingly, a work object is an instance of a work object class; a work performer is an instance of a work performer class; a work queue is an instance of a work queue class; and a work flow object is an instance of a work flow class.

A work object class defines a representation of an entity to be processed within a work flow system. For example, a work object class may define the representation of a process or transaction, such as approving a loan or making a credit card purchase. A work object class may include various kinds of data and may also reference other documents such as word processing documents, data files, responses to database queries, images, videos, sounds, or any other entity that can be stored and processed by a computer.

A work performer class defines a service or set of services to be applied to a work object. A work performer class may represent a task requiring human intervention, such as displaying some information contained within a work object to a user. Alternatively, a work performer class may represent an automated task, such as updating a database with information contained within a work object.

A work queue class defines a queue for work objects waiting to be serviced by a work performer. Typically, each work performer is associated with a specific instance of a work queue class.

In addition to the foregoing class definitions, a work flow system must also include run-time information about the objects within the system. Specifically, a work flow system must be able to determine which classes exist in the work flow system, how many of each class of object have been instantiated, and where each object is located. This information is provided by one or more globally visible configuration data structures. The configuration data structures are initialized at work flow system startup to include the necessary configuration information. Subsequently, the work flow system updates the configuration data structures as necessary when new objects are created or when old ones are destroyed. Thus a work flow system comprises three major components: (1) the definitions of all classes that may be instantiated within the work flow system; (2) configuration information describing specific instantiations of those classes and their relation to one another; and (3) a run-time engine.

Referring now to FIG. 2, an illustrative processing sequence of work object 22 in exemplary work flow system 20 is described. Work flow system 20 includes work object 22, work performers 26a, 26b, 27, and 28, and work performer queues 24, 25, and 29. Work object 22 resides as a database object in a server, and may be copied to a workstation where some of its data fields are operated upon by the work performers; the revised work object preferably may then be copied back to the server upon completion of the processing step. Alternatively, only selected variables may be extracted from the work object and provided to the workstation, with updated variables and the results of the processing task being copied back to the server upon completion. Work performers 26a and 26b each represent an instance of the same work performer class (i.e., either can perform a specified step or steps of a business procedure). Work flow system 20 also includes a run-time engine that coordinates, monitors, and controls the processing of work objects in the work flow system.

Specifically, the run-time engine is responsible for creating work objects, monitoring and updating their status as they are serviced by work performers, executing instruction sheets and dispatching work objects, or data extracted therefrom, accordingly. The run-time engine also monitors completion of the steps of the business procedure, and destroys an object when it is no longer needed.

The concept of the instruction sheet is employed in the above-mentioned Visual Workflo® product and comprises a linked-list of the steps to be performed to accomplish the business procedure. During authoring time, in which the work flow class is defined, the instruction sheet may be graphically represented as a series of steps of the business procedure to be performed, as shown in FIG. 3. At run-time, when the work flow system is instantiated, the instruction sheet is converted to a linked-list of centrally-stored work orders.

The skilled artisan will recognize that an instruction sheet may comprise any of a number of forms. For example, an instruction sheet could be written in a suitable computer programming language, including general purpose and special purpose scripting language. Languages such as C++, Java, or BASIC may be suitable languages for developing work object class instruction sheets. However, in a preferred embodiment of the present invention, an instruction sheet is programmed graphically, wherein icons represent various programming steps, and arrows or lines represent the flow of execution.

Referring to FIG. 3, an illustrative authoring form of an instruction sheet 30 is described. In addition to controlling the performance of various tasks, such as calculations or database lookup, an instruction sheet may embody procedural intelligence, such as distribution and approval policies of an organization. For example, instruction sheet 30 reflects policies regarding the levels of approval required for a business loan. Input icon 31 represents a step of obtaining pertinent loan information from an applicant, and may consist of a data entry operator transferring data from a handwritten application. The application information is stored in data fields contained within the work object. A basic check, indicated by assignment icon 32, is then performed to determine whether certain minimum criteria required for loan approval are met, and the result is stored in a data field of the work object.

A branch icon, such as icons 33, 35, and 37, provide an alternate execution path, depending upon the outcome of the test associated with each branch icon. For example, branch icon 33 may test to determine whether the application passes certain minimum criteria and the loan amount exceeds $10,000. If both conditions are met, execution branches to the step indicated by input icon 34; otherwise, execution continues to the step indicated by branch icon 37. At the step corresponding to input icon 34, a loan officer reviews the application. Since this branch is only taken for applications over $10,000, branch icon 33 implements a policy that loans meeting certain minimum criteria and for amounts over $10,000 require loan officer approval. Similarly, the step corresponding to branch icon 35 ensures that branch manager approval is obtained for loans exceeding $100,000.

Each of the icons of FIG. 3 represents an operation, service, or task, to be performed on loan work object 22. The skilled artisan will recognize that the icons shown in FIG. 3 represent only a fraction of the useful icons and that icons representing other statements, expressions, and control structures may also be incorporated into a instruction sheet. Indeed, in a preferred embodiment of the present invention, new icons representing custom tasks and processes may be added.

Associated with each work object, such as work object 22, is a run-time version of one or more instruction sheets (a list of work orders) that indicates to the run-time engine, in linked-list fashion, the sequence of services required in processing the work object.

A work class also may have multiple instruction sheets associated with it, corresponding to multiple states or conditions of a work object. For example, a work class may have an associated instruction sheet that gets executed when a work object is first instantiated to ensure that the work object is properly initialized. A second instruction sheet may provide instructions for the normal processing of an instance of the work class. And a third instruction sheet may specify actions to be taken when an instance of the work class is being deleted or the work flow system is being shut down, and, for example, may cause a work object to be archived or otherwise disposed of.

When the services of a particular work performer class are needed, a work object dispatching sub-system of the work flow system run-time engine identifies the work queue associated with the desired work performer class and enqueues a pointer to the work object accordingly. When a work performer associated with the class becomes available, e.g., by completing a work order for a previous work object, the work performer polls its associated queue to determine if there is another work object in need of servicing.

A work object typically includes a number of data fields that hold various information about the work object and the data it contains. For example, a work flow system for use in a bank branch office may include classes of work objects representing various banking transactions such as account deposits and withdrawals, or loan applications. A work object may, therefore, be a specific instance of a work object class representing business loan applications, and might include data fields such as amount and approval representing, for example, a desired loan amount and whether the loan has been approved, respectively.

Typically, the values of data fields are provided by the originator of the work object, such as by filling in a computer-based form, but may also be calculated by a work performer, retrieved from an online data base or automatically maintained by the work flow system run-time engine. For example, work object 22 of FIG. 2 may represent a computerized loan application form and work performers 26a and 26b may each represent a task of filling out an application form. Thus, a potential loan customer or bank employee may fill in a computer-based loan application form with relevant loan information, such as the amount and duration of the loan, as well as the customer's credit information. Other data, such as the amount of each installment payment, may be calculated later by other work performers, such as work performer 27 in work flow system 20.

Referring still to FIG. 2, after the form is completed, the work object 22 comprising the loan form is submitted to the run-time engine of work flow system 20 and processed in accordance with the instruction sheet associated with the work object class of which work object 22 is an instance. Illustratively, work object 22 is dispatched to work queue 24 which is associated with the class of work performers 26a and 26b. When work performer 26a becomes available, it polls work queue 24 and determines that work object 22 is the next item requiring service. Accordingly, work performer 26a dequeues work object 22, obtains a copy of work object 22 from the server, or the relevant subset of data from within the work object, and begins processing it. However, if queue 24 is empty, work performer 26a enters an idle state and periodically polls queue 24 until another work object has been enqueued. Similarly, work performer 26b also services work objects from work queue 24.

Multiple work performers instantiated from the same work performer class may be included in a work flow system to improve system response times, or to provide redundancy for important or high volume services. In the event that both work performer 26a and 26b are available, various algorithms or heuristics may be used to determine which work performer is to service a work object. When a work performer finishes servicing a work object, the work object is submitted to the work flow system run-time engine which determines further processing pursuant to run-time series of work orders for objects of that class.

Work flow system 20 of FIG. 2 is appropriate for a single work flow system that can encompass an entire organization without becoming unmanageable. As the work flow system increases in size, however, it may become difficult to design, administer, and maintain. Applicants have discovered it is desirable to be able to divide, or partition, a large work flow system into multiple smaller, cooperative, work flow systems, so that, for example, separate work flow systems may be implemented for each department of a corporation. While partitioning a large work flow system may ease the design and maintenance burden of the work flow system as a whole, the presence of multiple work flow systems presents other difficulties, for which the present invention provides solutions.

From a theoretical point of view, principles of object oriented design, including data abstraction and information hiding, imply that a work flow system, such as work flow system 20 of FIG. 2 should be semantically self-contained. In a pure object-oriented work-flow system, each class definition and each object within the boundaries of work flow system 20 should refer only to other classes and objects contained within work flow system 20. This implies that objects within the boundaries are invisible, and hence inaccessible, to objects outside the boundaries and, conversely, objects outside the boundaries of work flow system 20 are invisible to objects within work flow system 20.

In an environment consisting of a single work flow system, the semantic impenetrability of a work flow system boundary is not a concern because all objects, whether work objects, work performers, or work queues, are contained within the work flow system. Thus, a single instance of a work performer class may service all work objects in the work flow system. However, in a multiple work flow environment, such as that shown in FIG. 4, a single work performer cannot service all work objects. Rather each work flow system 40 and 42 must instantiate at least one work performer of each work performer class to be used in that particular work flow system.

Figure 4:
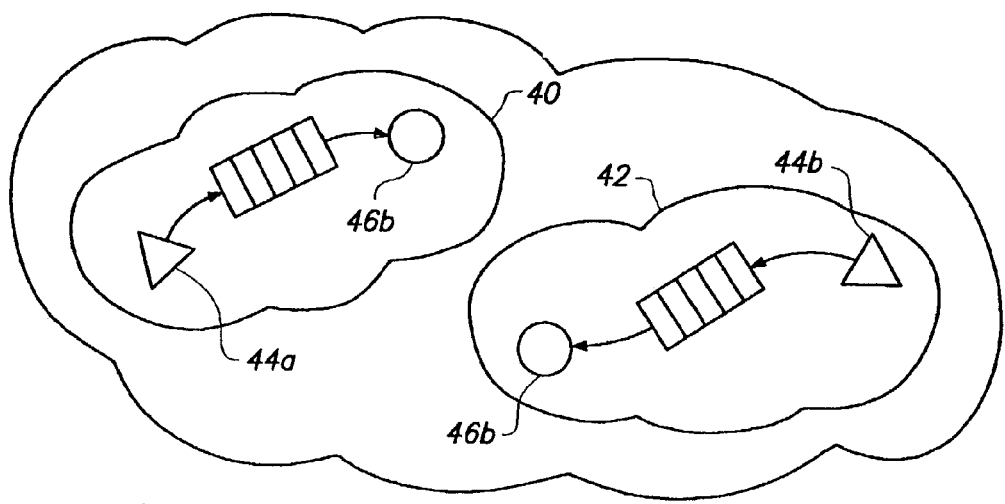
FIG. 4 is a diagram of a single site, multiple partition work flow.

For example, in FIG. 4, work flow system 40 may comprise a loan department procedure of a bank while work flow system 42 comprises an accounting department procedure of the same bank. Furthermore, work objects 44a and 44b may each represent a purchase order for new computer equipment for their respective departments, which must be approved by the bank's management information services (MIS) department. Because both work flow systems 40 and 42 require the task of obtaining MIS approval, each must include a work performer, such as 46a and 46b, that performs that task.

Providing instances of work performer 46a and 46b in each of work flow systems 40 and 42 is an inefficient use of system resources because all of the class information associated with work performers 46a and 46b must be duplicated in each work flow system. Furthermore, such duplication violates principles of abstraction and data hiding, since modifying the behavior or characteristics of a work performer class in one work flow system would necessitate re-coding each copy of that work performer class in all work flow systems that use a work performer of that class. It may also be difficult to automatically gather and report information on an organization-wide level. For example, it may be difficult to gather comprehensive bank-wide statistics on computer purchases.

However, allowing unrestricted access across a work flow system boundary is undesirable with respect to maintenance concerns. For example, modifying an object in one work flow system may cause objects in another work flow system to cease functioning properly. Also, for security reasons it may be disadvantageous to allow external objects to access internal objects of a work flow system. For example, free access to a work performer that debits a bank account may allow a rogue external object to accidentally or intentionally post a debit to an incorrect bank account.

In accordance with the principles of the present invention, the maintenance and administrative burden of a work flow system is reduced while reliability and security are enhanced by providing limited access across work flow system boundaries. This is accomplished by allowing a work flow system to advertise specific services that may be accessed by external objects. A special work performer class therefore is created that encapsulates those services and provides a protected, well-defined interface for accessing those services.

In a preferred embodiment of the present invention, a C++ or Java class representing a work flow system is created wherein the publicly visible member functions provide access to those services that the work flow system advertises for export. The exporting class definition, therefore, appears to be a work performer class definition. Thus, another work flow system desiring to access the advertised services need only include the work performer class definition of the exporting work flow system in its own list of object classes.

Figure 5:
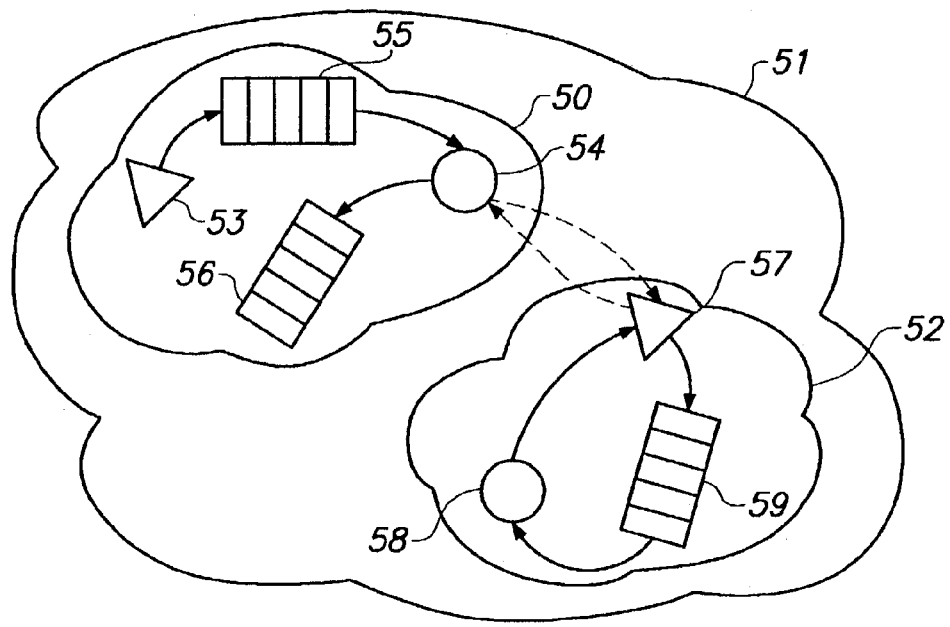
FIG. 5 is a schematic of a single site, multiple partition work flow in accordance with the principles of the present invention.

Referring now to FIG. 5, work flow systems 50 and 52 may be set up for the accounting departments of an organization. Work flow systems 50 and 52 may then export, or make public, various services, such as get_purchase_approval or update_accounts_receivable for use by other work flow systems. To export these services, a work performer class is created that is incorporated into other work flow systems. An instance of a work flow system work performer class functions as a proxy for a work performer in the work flow system advertising the service. The proxy work performer has access into the exporting work flow system through the mechanism of an agent work object.

Still referring to FIG. 5, work flow system 50 alternatively may belong to the research department of an organization, and work object 53 may correspond to a purchase request for new computer equipment. At some point in the processing of work object 53 within research department work flow system 50, it may be necessary to obtain accounting department approval of the purchase request. Rather than explicitly incorporate an accounting department process step in work flow system 50, work flow system 52 (corresponding to the accounting department of the organization) exports a service get_accounting_approval. This service is incorporated into work flow system 50 via proxy work performer 54. When work object 53 requires the service get_accounting_approval, the work flow system run-time engine determines that the service is provided by proxy work performer 54 and dispatches work object 53 accordingly.

Proxy work performer 54 dequeues the pointer to work object 53 from work queue 55, obtains a copy of the entire work object (or a subset of its data) from the repository and determines that work object 53 is requesting service from work flow system 52. Proxy work performer 54 then causes the creation of agent work object 57 in work flow 52. Any required parameters of work object 53 are transferred to agent work object 57, the identity of the originating work flow and work object (i.e., work object 53 in work flow 51) are saved, and a pointer corresponding to agent work object 57 is enqueued to work queue 59 to await the first available service in work flow system 52 of the kind requested (e.g., the service provided by work performer 58). While agent work object 57 is being processed, originating work object 53 is locked to prevent inconsistencies between the values of data in the agent work object and originating work object 53.

When agent work object 57 has finished executing the work orders associated with the exported service, a special terminate instruction is invoked. The terminate instruction causes the identity of the originating work flow and work object to be retrieved. Any return values may then be transferred back from agent work object 57 to originating work object 53. Finally, agent work object 57 is disposed of, the list of work orders associated with work object 53 is updated, and work object 53 is unlocked and returned to the run-time engine of work flow system 50 for further processing.

In the preceding discussion it has been assumed that each work performer queue is visible to all work performers servicing that queue. In a work flow system running within a local area network environment, a global queue for a particular work performer class may be created and maintained on a globally visible network server. As long as communication traffic on a LAN is not excessive, communication delays are expected to remain relatively short and periodic polling of queues by the associated work performer objects is not expected to significantly impact communication throughput.

However, it is contemplated that the foregoing design may begin to fail when a work flow system expands beyond a single network site. The separation of a networked enterprise into multiple independent, mostly-autonomous, physical sites is expected to pose a formidable problem in work flow system design. It is desired that portions of a single work flow system may be distributed across multiple physical sites located anywhere in the world, but seemingly must cooperate with each other as if there were no separation. For example, in FIG. 6, enterprise network 60 comprises LANs 61a, 61b and 61c located at disparate sites around the globe. However, a work flow spanning these sites should appear to the user as a single network, i.e., there should be little discernable difference to a user on LAN 61a between a work object being serviced by a work performer in LAN 61a and one being serviced by a work performed in LAN 61c.

Interlinked networks may be classified by type according to speed and availability. As used herein, speed refers to the rate at which data can transmitted over the link. For example, a T3 line can carry data at a rate of about 45 million bits per second, whereas a dial-up modem link is limited to about 28 thousand bits per second. Availability refers to whether access to the link is permanent or only exists on a transient basis. For example, a leased line may be available continually whereas a satellite link may only be available during certain times of the day. A transient link may require a mechanism to store a transmission and then forward the transmission when a link becomes available, and may introduce substantial delay in transferring data to a remote site.

Figure 6:
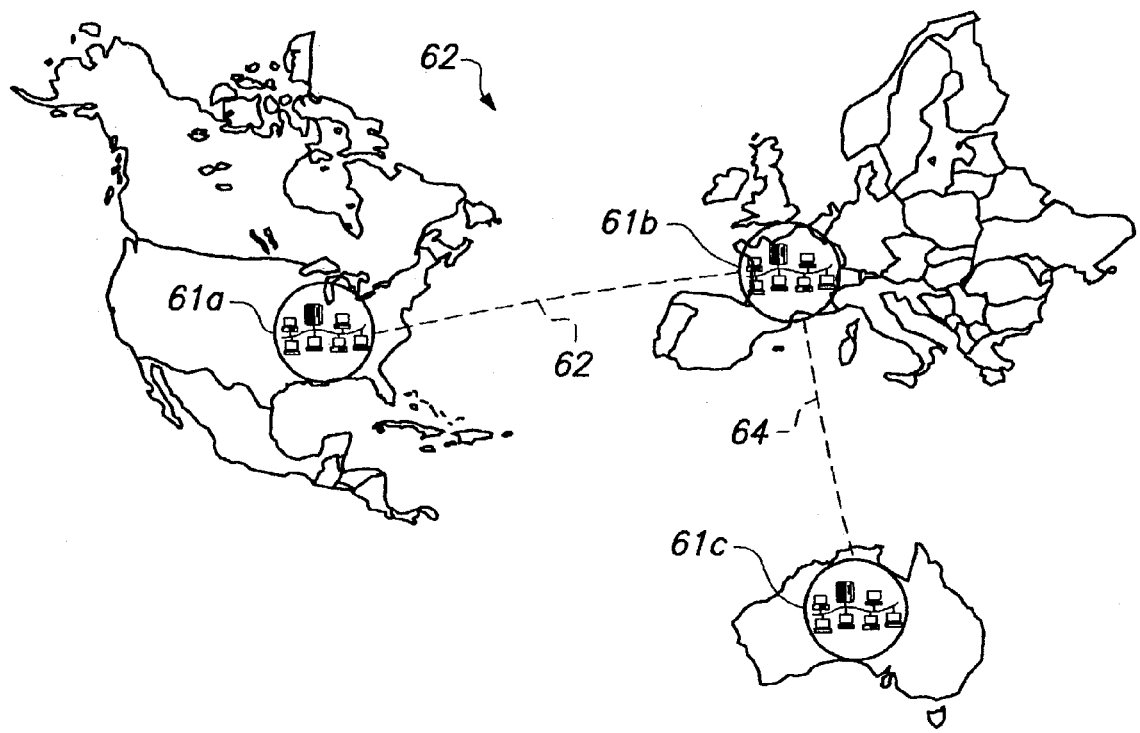
FIG. 6 depicts an exemplary enterprise-wide, global scale computer network.

In enterprise-wide work flow system 60 of FIG. 6, LAN 61a may be connected to LAN 61b using dedicated line 62 or other means to provide continuous, high-speed, inter-LAN communications, in which case the connection between LANs 61a and 61b would be classified as both fast and permanent. Conversely, LAN 61a may be connected to LAN 61c on an as-needed basis by a dial-up type modem connection via link 64. Such a connection would be a slow and transient connection.

Typically, when a work object or subset of data is dispatched to a work performer, the run-time engine of the sending work flow system waits to receive an acknowledgment from the receiving work queue before proceeding to service another work object. If the runtime engine of the sending work flow system and the destination work queue are linked by a fast, permanent connection the wait is short and system response times remain acceptable to the end user. However, when the sending work flow system and receiving work queue share a slow or transient link, waiting for an acknowledgment may result in unacceptably slow system response times.

Figures 7, 8:
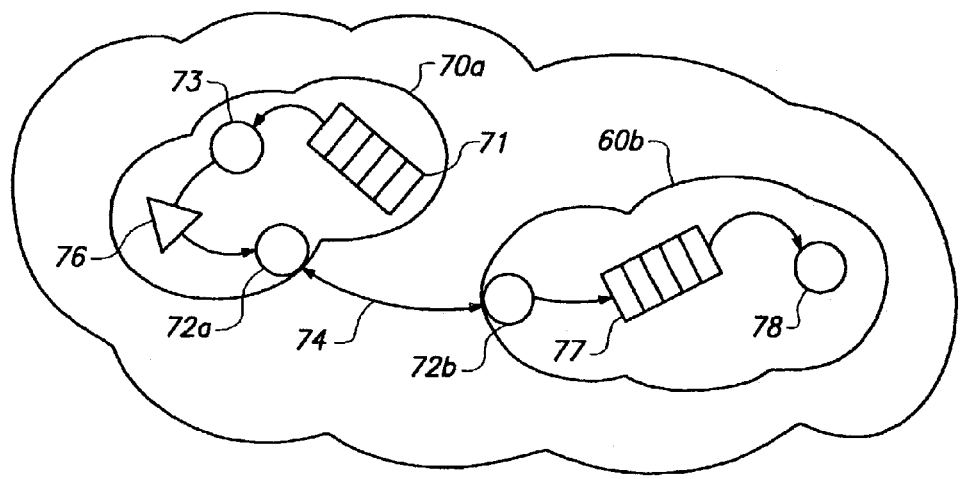
FIG. 7 is a schematic representation of a single work flow spanning multiple physical sites.
FIG. 8 is an exemplary partition table arranged in accordance with the principles of the present invention.

Accordingly, referring to FIG. 7, another aspect of the present invention is described. In FIG. 7, gateway work performers 72a and 72b are provided at either end of communication link 74 interconnecting work flow partitions 70a and 70b. Gateway work performers 72a and 72b serve as local receivers for work objects or extracted data that are destined for remote work queues. For example, when work object 76 is destined for remote work queue 77, it is sent to gateway work performer 72a for transmission to the remote site. Local gateway work performer 72a provides an acknowledgment to the run-time engine of work flow system 70, thus allowing the run-time engine of work flow system 70 to provide another work object to work performer 73 for servicing. Gateway work performer 72a then transmits the work object to the remote site in a manner appropriate for the type of communication link.

For example, if link 74 is a fast and permanent connection, gateway work performer 72a may immediately transmit the work object to gateway work performer 72b at the remote site. By comparison, if communication link 74 is a transient connection, work performer 72a may defer transmission until the link is available, or may accumulate multiple work objects so that they may be transmitted in bulk to the remote site. One skilled in the art will recognize that gateway work performers 72a and 72b may be enhanced to provide additional capabilities such as gathering statistics for determining inter-site transit times, to aggregate multiple work objects or subsets of data destined for a remote site to enable transfer in a single transmission, performing data compression to reduce transmission times, or encrypting data to improve data security while transmitting over open lines, such as telephone lines or satellite links.

In addition to delays in receiving acknowledgments, communications links other than fast, permanent links introduce other concerns. For example, using current technologies, typical dial-up analog connections are limited to transmission rates in the neighborhood of three thousand bytes per second. While digital connections using ISDN may increase the data rate by a factor of four over analog connections, the data rate is still very low compared to a rate of 10 million bits per second for a typical Ethernet LAN. In addition, unless the dial-up link is always connected, additional time is expended in establishing the link. Thus, if a work performer exists on LAN 61c, of FIG. 6, while its class queue is located on LAN 61a, it may take several seconds for a dial-up link to be established each time work performer polls the queue. In addition, a large organization may have many work performers and corresponding queues distributed across multiple LANs. Even when high speed dedicated digital links are employed, the overhead associated with polling a class queue on another LAN may negatively impact system throughput and performance.

In accordance with further principles of the present invention, a single global queue paradigm is retained through the use of a structure referred to herein as a partitioned logical queue. Instead of having a physical work queue, as described hereinabove with respect to FIG. 2, each work performer class is associated with a logical queue. A logical work queue provides the appearance of a single global queue, but internally it is divided into partitions, wherein each partition is associated with a physical queue. In essence, a logical work queue provides an additional layer of abstraction between the work flow system run-time engine and the work performers in the work flow system. A logical work queue accepts work objects destined for a work performer class queue and assigns the work object to one of the logical partitions of the logical queue based on various properties of the work object.

FIG. 8 represents screen display 80 of a partitioned logical queue as table 81, with each row 81a, 81b, . . . 81n of table 81 corresponding to a logical partition. A first attribute of a queue partition is its partition expression 82, which may depend on information within data fields of the work object. When a work object is dispatched to the logical queue, partition expression 82 for each partition queue 81*a* . . . 81*n* is evaluated. The work object is then assigned to a work queue based on the results of evaluating partition expressions 82. If only one partition expression is true, the work object is assigned to the corresponding queue partition. If more than one partition expression evaluates as true, various heuristics may be used to select a queue partition, for example, heuristics relating to throughput statistics of the various queues, locality, etc. Lastly, if no partition expression is true, an exception is declared and an exception work order for the work object being enqueued is invoked by the work flow system run-time engine.

For example, in FIG. 8, the logical queue associated with the Loan Officer class of work performers has three partitions, each represented by a row (81*a* to 81*c*) in table 81. If a work object to be enqueued has a loan amount greater than $203,500 partition expression 82 in the first partition 81*a* is evaluated as true and the work object is assigned to the Loan Officer queue of the first partition. However, if the loan amount is less than or equal to $203,500 the first partition equation is evaluated as false, and the partition expressions in the second and third rows, 81*b* and 81*c*, are true.

In a preferred embodiment of the present invention, each partition, 81*a* . . . 81*n*, of a partitioned queue has an associated weight 83 as shown in the second column of FIG. 8. When more then one partition expression evaluates to true, the work object is dispatched in accordance with a weighted probability distribution based on weights 83 assigned to each partition 81*a* . . . 81*c*. For example, in FIG. 8 partitions 81*b* and 81*c* have the same partition expression, but in partition 81*b* weight 83 has a value of 2, while in partition 81*c* weight 83 has a value of 1. Thus, two-thirds of loan applications for less than $203,500 are enqueued to the queue partition associated with row 81*b* of the table, and the remaining one-third to the third queue partition (81*c*).

As discussed hereinabove, it is desirable to provide the paradigm of a single work performer queue per class of work performer in a work flow system. Due to performance issues, it is also desirable to actively direct work objects to remote queue partitions instead of requiring remote work performers to poll their associated work queues across a low bandwidth communication channel. However, it is possible for a work object to be directed to a remote queue partition and never be serviced. For example, a document needing approval may be dispatched to a remote queue partition that is served by a person who happens to be on vacation. Additionally, it would be desirable to provide a load-balancing capability that ensures that some work performers are not underutilized and sitting idle for long periods.

The foregoing issues may be addressed in several ways. For example, partition expressions in a work performer queue partition table may be updated to reflect non-availability of a service (due to personnel vacation, etc.). Alternatively, work objects may have associated with them information for identifying specific work performers which are to process the work object, thus overriding the normal work object dispatch function of a partitioned work performer queue. However, these potential solutions may be undesirable due to increased administrative burden and/or processing overhead.

In a preferred embodiment of the present invention, the foregoing problems are solved by periodically redistributing work objects from one partition of a work performer queue to another partition. Various criteria, such as elapsed time in a queue or queue size, may be specified to indicate when work objects should be redistributed. Redistribution is accomplished through the mechanism of a load balancing work object and load balancing work performers.

In accordance with this aspect of the present invention, each queue partition has an associated load balancing work performer. A load balancing work object travels in a circuit that visits all load balancing work performers associated with queue partitions having the same partition expression. The load balancing work object carries with it information concerning work objects matching the corresponding partition expression. When a load balancing work performer services the load balancing work object, it determines the status of each work object in the work queue for the local work flow system and as well as information for those work objects carried by the load balancing work object. Based on the status of the work objects, the load balancing work performer selectively transfers work object pointers from the load balancing work object to the queue of the local work flow system and/or from the queue to the load balancing work object. The load balancing work object is then dispatched to the next load balancing work performer in the circuit, which repeats the process just described.

Figure 9:
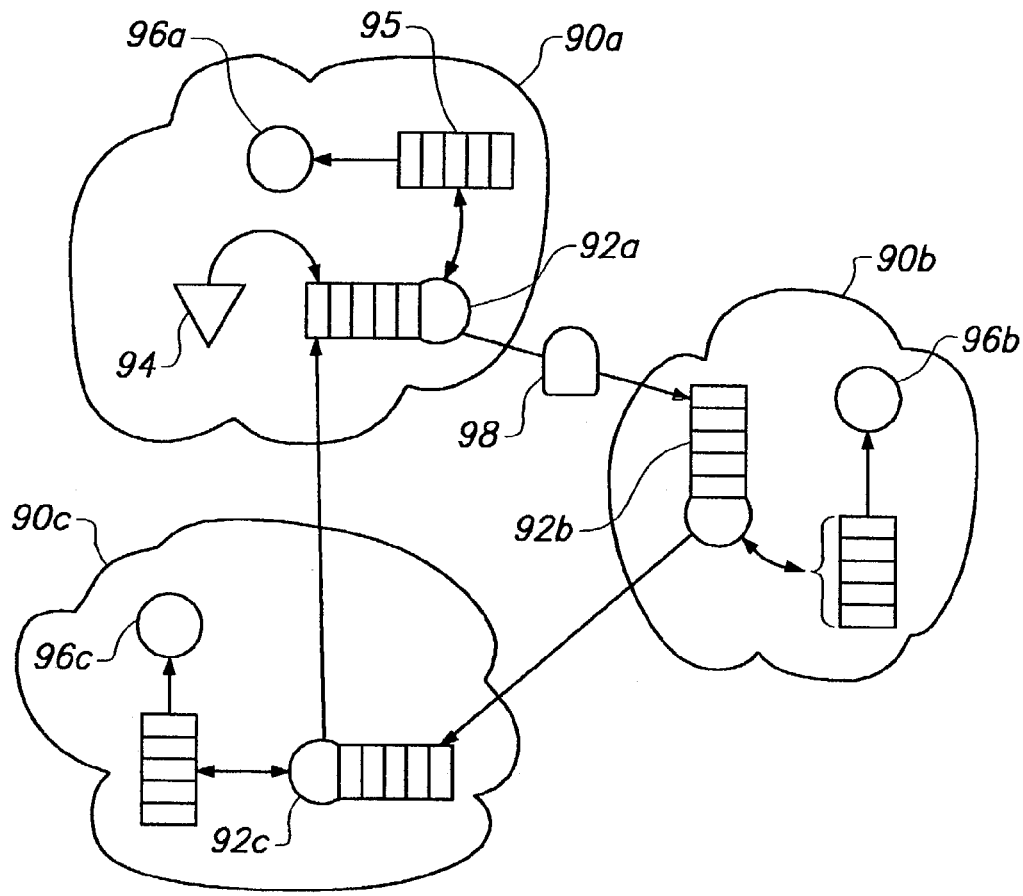
FIG. 9 illustrates the use of a load balancing technique to provide a virtual queue in an enterprise-wide work flow system.

For example, referring to FIG. 9, work flow 90 is divided into partitions 90*a*, 90*b*, and 90*c*, including load balancing work performers 92*a*, 92*b*, and 92*c*, respectively. Let it be assumed that based on the partition expressions for partitions 90*a* to 90*c*, work object 94 is to be enqueued to work performer 96*a* in work flow 90*a*. A pointer for work object 94 is, therefore, enqueued to load balancing work performer 92*a* for transfer to work flow 90*b*. Load balancing work object 98 circulates between load balancing work performers 92*a*, 92*b*, and 92*c*. Information relating to work object 94 is inserted into load balancing work object 98 the next time it arrives at load balancing work performer 92*a*. Subsequently, when load balancing work object 98 arrives at load balancing work performer 92*b*, the pointer for work object 94 is removed from the load balancing work object and enqueued for work performer 96*b*. At the same time, load balancing work performer 92*b* may insert information for other objects (not shown) bound for partitions 90*a* and 90*c* into load balancing work object 98 to be carried back to their respective load balancing work performers.

Applicants expect that it may also be desirable to allow load balancing work performers to override the partition assigned to a work object based on the partition expressions. For example, if work object 94 of FIG. 9 has been enqueued for work performer 96*a* for an excessive length of time, load balancing work performer 92*a* may delete it from work performer queue 95 and insert a pointer for work object 94 into load balancing work object 98. Then either of load balancing work performers 92*b* or 92*c*, in response to the excessive age of work object 94, may transfer the information for work object 94 from load balancing work object 98 and enqueue a pointer for work object 94 to work performer queues 96*b* or 96*c*, respectively. As one skilled in the art will appreciate, criteria other than length of time enqueued may be used to determine when the partition assigned to a work object should be overridden, such as, the length of the destination queue, the time of day, or a heuristic based on average service times at work performers 96*a*, 96*b*, and 96*c*. Thus, using a load balancing technique to virtualize a global queue may provide additional benefits such as dynamically balancing queue work loads, providing work performer redundancy, and ensuring all work objects are serviced in a reasonable length of time.

In addition to load balancing issues, transactional security concerns must also be addressed when distributing work objects across work flow systems at geographically separated sites. For example, if an network link fails during transmission of a work object, a work flow system must be able to recover without losing or corrupting the work object.

Known techniques for remote data base transaction processing typically involve the use of file or record locking to provide transactional integrity. For example, a source site may first obtain a record lock for the record being transmitted and, using a remote procedure call, may obtain a corresponding record lock at the destination site. The record is then transmitted. After the destination site acknowledges receipt of the transferred record, the source site lock is removed, and then the destination site lock is removed. However, if the source site were to shut down or fail between obtaining the source lock and releasing the destination lock recovery of the transaction may be difficult or impossible.

Figure 10:
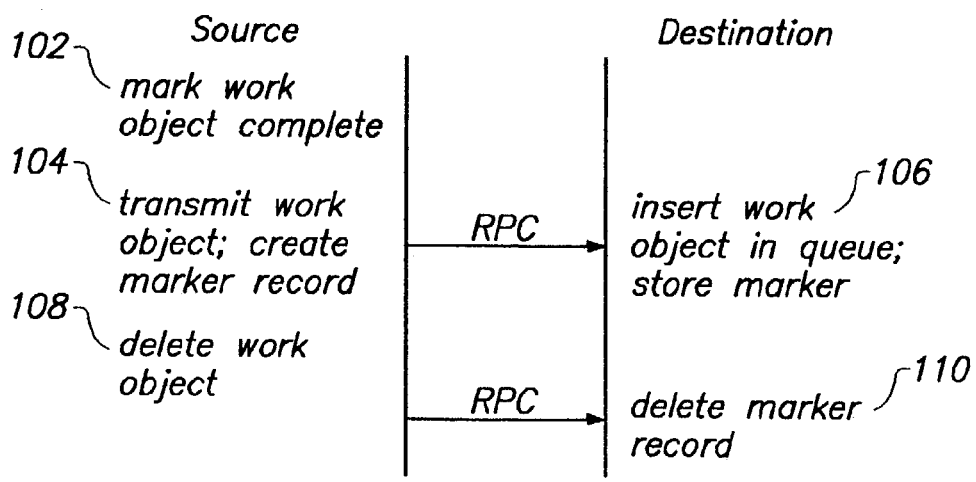
FIG. 10 is an illustrative work object transmission sequence configured in accordance with the present invention.

In accordance with principles of the present invention, transactional integrity is ensured by a multi-phase work object transmission sequence as illustrated in FIG. 10. While FIG. 10 illustrates transmission of work objects, it is to be understood that selected subsets of data extracted from a work object may be handled in the same manner. First, at step 102, the source marks the work object to be transmitted as completed, i.e., processing at the current site is finished. Then, at step 104, using remote procedure calls, the source site enqueues the work object and creates a marker record at the destination site (step 106). This operation is completed as an atomic step. The source then deletes, backs up, or otherwise archives its copy of the work object, at step 108. And lastly, at step 110, the source site work flow engine uses a remote procedure call to delete the marker record at the destination site. Note that once the work object is enqueued and the marker record created, the destination site may begin processing the work object. In contrast, when using a record or file lock, the destination site may not begin processing until the lock is removed.

Thus, the transmission system of the present invention avoids the use of file or record locking. Furthermore, the status of a work object can easily be determined at any time. For example, when a work flow system is restarted after a shutdown or failure, the presence of a marker record indicates that a work object was received, but that the source site may still need to delete its copy of the completed work object. Analogously, the presence of a work object marked complete indicates that it was in the process of being transmitted. By checking for the presence of a marker record at the destination, the source site may quickly ascertain whether the work object was successfully transmitted and may retransmit or delete the work object and marker record as appropriate.

Disclosed hereinabove are various principles of the present invention which may be employed singly or in combination to construct an enterprise-wide work flow system. One skilled in the art will also appreciate that the present invention can be practiced by other than the described embodiments, which are presented for purposes of illustration and not of limitation, the present invention being limited only by the claims which follow.

What is claimed is:

1. Computer readable storage that stores a program for processing documents, said program capable of being executed by a computer to cause the computer to:
   create an instance of a first work flow class representing a first work flow system corresponding to a first organizational entity, wherein the first work flow system provides a first plurality of services;
   create an instance of a second work flow class representing a second work flow system, the second work flow system including a work performer class that acts as a proxy for at least one of the first plurality of services offered by the first work flow system;
   on the second work flow system, create an instance of a first exporting class that acts as a proxy and is used to provide access to one or more other work flow systems to at least a portion of the first plurality of services that process at least one of documents or business procedures, wherein the first exporting class appears to the other work flow systems to be a local document or business procedure processing work performer class, wherein at least a first of the other work flow systems corresponds to a second organizational entity; and
   under control of the instance of the first exporting class that acts as a proxy on the second work flow system,
      determine that a service from among the first plurality of services offered by the first work flow system is being requested; and
      cause creation of an agent work object at the first work flow system, wherein the agent work object executes work orders at the first work flow system and returns data to the instance of the first exporting class.

2. The computer readable storage as defined in claim 1, wherein said program is capable of being executed by a computer to cause the computer to create instances of work object classes corresponding to document work objects that need to be processed using both at least a portion of the first plurality of services offered by the first work flow system and services offered by the first of the other work flow systems.

3. The computer readable storage as defined in claim 1, wherein the first work flow system corresponds to an accounting entity and a second work flow system corresponds to a research entity.

4. The computer readable storage as defined in claim 1, wherein the computer is a first computer, wherein the instance of the first work flow class is created at the first computer, wherein the first computer is coupled to a second computer, and wherein the instance of the second work flow class is created at the second computer.

5. A work flow apparatus, comprising;
   a first work flow system, including computer readable storage and a first plurality of work performer classes corresponding to one or more document or business procedure processing services offered by the first work flow system;
   a second work flow system, including computer readable storage and at least a second work flow system work performer class that acts as a proxy and that is used by the second work flow system to access work performer services for processing documents or business procedures offered by the first work flow system to process one or more documents or business procedures;
   wherein the second work flow system is configured to create an instance of the work performer class that acts as a proxy; and
   wherein the instance of the work performer class that acts as a proxy at the second work flow system is configured to,
      determine that a service from among the first plurality of services offered by the first work flow system is being reciuested; and
      cause creation of an agent work object at the first work flow system, wherein the agent work object executes work orders at the first work flow system and returns data to the second work flow system.

6. The work flow apparatus as defined in claim 5, wherein services corresponding to the first plurality of work performer classes are hosted by the first work flow system.

7. The work flow apparatus as defined in claim 5, wherein the at least second work flow system work performer class corresponds to service not offered by the second work flow system.

8. The work flow apparatus as defined in claim 5, wherein the first work flow system correpsonds to a research entity and the second work flow system corresponds to an accounting entity.

9. The work flow apparatus as defined in claim 5, wherein the first work flow system corresponds to a first accounting entity.

10. The work flow apparatus as defined in claim 5, wherein an instance of the at least second work flow system work performer class acts as a proxy for a plurality of instances of the first plurality of work performer classes.

11. The work flow apparatus as defined in claim 5, wherein the first work flow system includes a third plurality of work performer classes that are not available to the second work flow system.

12. The work flow apparatus as defined in claim 5, wherein the second work flow system includes a second plurality of work performer classes corresponding to services offered by the second work flow system.

13. A first work flow system, comprising:
  a first plusrality of work service classes in computer readable storage corresponding to one or more document processing or business procedure services offered by the first work flow system;
  at least one work service class in the computer readable storage corresponding to one or more document or business procedure processing service offered by a second work flow system to at least the first work flow system so that the first work flow system can process at least one document or business procedure using at least one document or business procedure processing service offered by the second work flow system;
  wherein the first work flow system is configured to create an instance of the at least one work service class; and
  wherein the instance of the at least one work service class is configured to,
    determine that a service from the one or more document or business procedure processing services offered by the second work flow system is being requested; and
    cause creation of an agent work object at the second work flow system, wherein the agent work object executes work orders at the second work flow system and returns data to the first work flow system.

14. The first work flow sytem as defined in claim 13, wherein the services offered by the second work flow system include accounting services.

15. The first work flow system as defined in claim 13, further comprising work object classes corresponding to work objects that need to be processed using the services offered by the first work flow system and the second work flow system.

16. The first work flow system as defined in claim 13, further comprising a run-time engine that determines when a first work object needs to be processed using the services offered by the second work flow system.

17. A method of providing work flow services, comprising:
  storing in a computer a first work flow class definition for a first work flow system;
  storing in a computer a first work performer class definition corresponding to a work performer class that processes, at least in part, a first work object via a first work system service available to at least a second work flow system, wherein the first work object corresponds to a document or a business procedure;
  storing in a computer a sceond work flow class definition for the second work flow system;
  storing in a computer a first proxy work performer class definition for the second work flow system, wherein the first proxy work performer class corresponds to at least the first work flow system service;
  creating a first proxy work performer at the second work flow system corresponding to the first proxy work performer class, wherein the first proxy work performer causes the creation of a first agent work object corresponding to the first work object, wherein the first agent work object is processed by the first workflow system service, and wherein, when the processing of the first agent work object is complete, data is returned from the first workflow system service to the first proxy work performer at the second workflow system;
  wherein the first work object is locked while the first agent work object is being processed by the first work flow system service; and
  causing, at least in part, the first work object agent to be routed for processing to at least one work performer local to the first work flow system.

18. The method of claim 17, wherein the first work flow class definition for the first work flow system is stored in a first computer and wherein the second work flow class definition for the second work flow system is stored in a second computer.

19. Computer storage storing a program, said program capable of being executed by a computer to cause the computer to:
  create an instance of a first work flow class for a first work flow system;
  create an instance of a first work service class for processing a document or business procedure corresponding to a first work flow system document or business procedure processing service available to at least a second work flow system;
  create an instance of a second work flow class for processing at least one of a document or business procedure for the second work flow system;
  create an instance of a first proxy work service class for the second work flow system, wherein the first proxy work service class corresponds to at least the first work flow system document or business procedure processing service, wherein the instance of the first proxy work service class causes the creation of an agent work object, wherein the agent work object is processed by the instance of the first work flow class, and wherein, when the processing of the agent work object is complete, data is returned from the instance of the first work flow class to the instance of the second work flow class; and
  cause, at least in part, at least one document or business procedure to be processed using the first work flow document or business procedure processing system service.

20. The computer storage as defined in claim 19, wherein said program is capable of being executed by a computer to cause the computer to create instances of work object classes corresponding to work objects that need to be processed using both first work flow system service and services offered by the second work flow system.

* * * * *

UNITED STATES PATENT AND TRADEMARK OFFICE
CERTIFICATE OF CORRECTION

PATENT NO. : 7,603,649 B2
APPLICATION NO. : 10/328072
DATED : October 13, 2009
INVENTOR(S) : Poindexter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Fifth Day of October, 2010

David J. Kappos
*Director of the United States Patent and Trademark Office*